Sept. 8, 1970     R. E. TALMO ET AL     3,527,100

TRANSDUCER

Filed Nov. 22, 1968

ROBERT EUGENE TALMO
HECTOR AGUILAR
VICTOR NICHOLAS LAWFORD
INVENTORS.

BY

ATTORNEY

United States Patent Office 3,527,100
Patented Sept. 8, 1970

3,527,100
TRANSDUCER
Robert E. Talmo and Victor N. Lawford, Pasadena, and Hector Aguilar, Monterey Park, Calif., assignors to International Telephone and Telegraph Corporation, New York, N.Y., a corporation of Delaware
Filed Nov. 22, 1968, Ser. No. 778,273
Int. Cl. G01l 9/04
U.S. Cl. 73—398                                    1 Claim

ABSTRACT OF THE DISCLOSURE

The invention includes a pressure transducer having a Bourdon tube connected to a cantilever beam. Strain gages are fixed to the beam for connection in a bridge circuit. The bridge circuit thus produces an output signal in accordance with pressure.

BACKGROUND OF THE INVENTION

This invention relates to transducers, and more particularly to a simple pressure transducer.

In the past it has been the practice to construct pressure transducers of movable members or diaphragms. These constructions have been relatively complicated.

SUMMARY OF THE INVENTION

In accordance with the device of the present invention, the above-described and other distdvantages of the prior art are overcome by providing a Bourdon tube which deflects a cantilever beam. The beam may have a strain gage fixed to its two opposite sides. The strain gages may thus be connected in two adjacent legs of a bridge to provide an output proportional to pressure. The invention may thus be constructed of a few uncomplicated component parts.

The above-described and other advantages of the invention will be better understood from the following description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
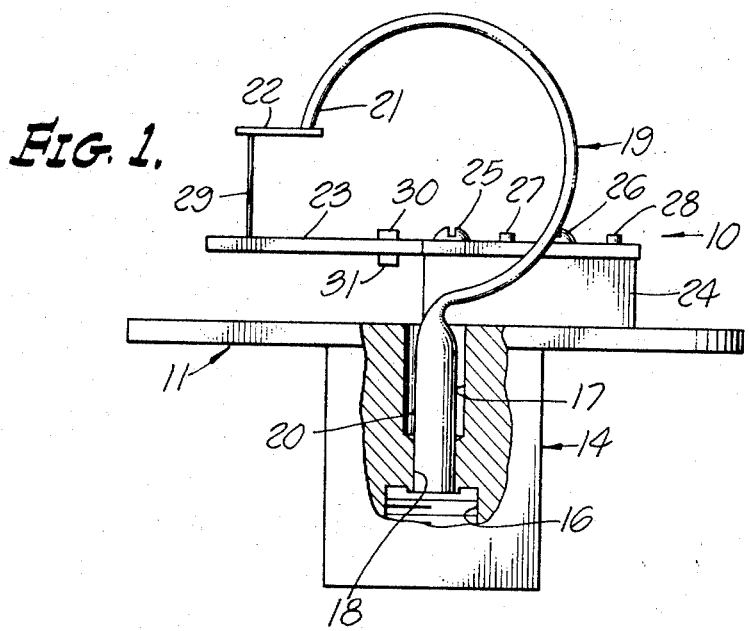
FIG. 1 is a side elevational view partly in section, of one embodiment of the invention.
Figure 2:
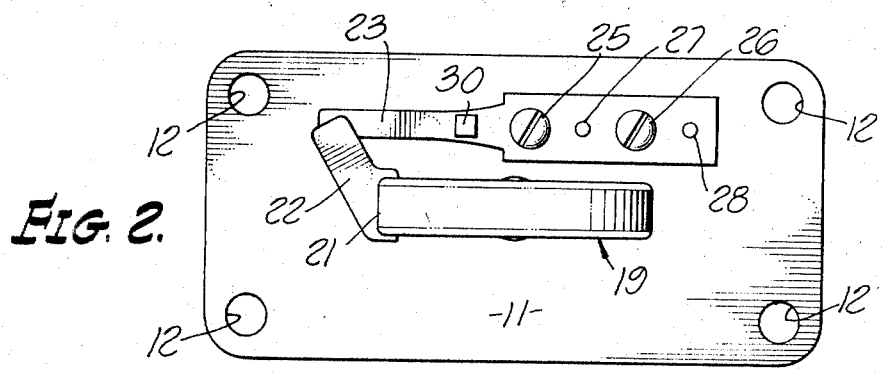
FIG. 2 is a top plan view of the embodiment shown in FIG. 1.

In FIG. 1 the transducer of the invention is indicated at 10. Transducer 10 has a base of mounting plate 11. Plate 11 has mounting holes therethrough as shown in FIG. 2. Plate 11 may thus be fixed to a fluid containing receptacle or pipe line in a fluid type manner. A projection 14 is made integral with plate 11.

Projection 14 has a bore 16, a counter-bore 17, and a shoulder 18 therebetween. Bore 16 may be threaded for making a normal pressure connection. A Bourdon tube 19 is provided, having a shank 20 sealed to shoulder 18. Bourdon tube 19 has a free end 21 to which a horizontal plate 22 is fixed. A leaf spring-like cantilever beam 23 and a supporting block 24 are fixed to plate 11 by cap screws 25 and 26. Block 24 has guide pins 27 and 28 fixed thereto. Guide pins 27 and 28 project through corresponding holes in beam 23. A vertical wire 29 is fixed to plate 22 and to the free end of beam 23.

Single crystal silicon piezoresistance strain gages 30 and 31 are fixed to opposite sides of beam 23.

Figure 3:
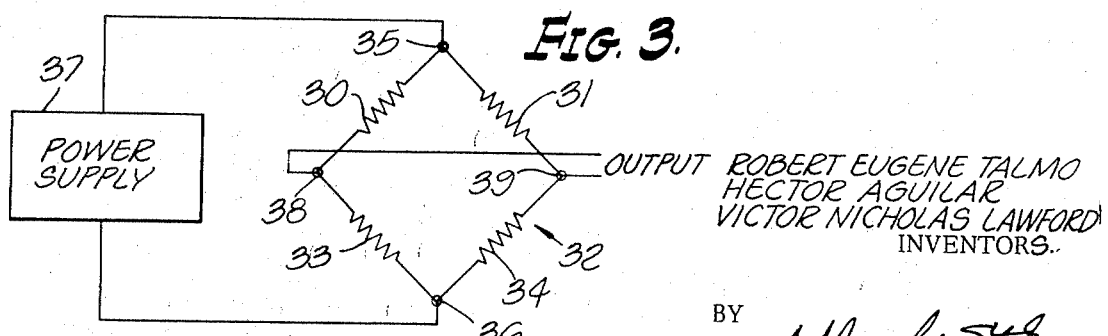
FIG. 3 is a schematic diaphragm of a strain gage circuit employed with the embodiment shown in FIGS. 1 and 2.

As shown in FIG. 3, strain gages 30 and 31 are connected, respectively, in two adjacent legs of a strain gage bridge 32. Resistors 33 and 34 are connected in the other two legs. Power is supplied to bridge corners 35 and 36 by a power supply 37. The output of the bridge is taken at corners 38 and 39.

In the operation of the transducer 10, when the pressure inside Bourdon tube 19 is the same as the pressure outside plate 22 and beam 23 will be in the horizontal positions shown, with wire 29 located perpendicularly thereto. When the pressure inside Bourdon tube 19 increases over the pressure outside thereof, the Bourdon tube 19 will expand and the free end 21 will move upwards. This motion is transmitted by the vertical wire 29 to the free end of the beam 23 and the beam 23 will be deflected. This will cause an unbalance of bridge 32 through strain gages 30 and 31. The output of bridge 32 will then be proportional to the pressure sensed by Bourdon tube 19.

Beam 23 is tapered at 23' to provide a constant strain region which allows non-critical placement of gages 30 and 31. Strain in a rectangular beam falls off exponentially from a maximum at the fixed point to zero at the free end of the beam.

The invention may be applied to the production of a signal proportional to absolute pressure by evacuating and sealing the Bourdon tube 19. Alternatively, an evacuation container may be sealed over the apparatus above plate 11. Hermetic seals are then required to bring the electrical connections through the sealed container.

It is an advantage of the invention that wire 29 provides a convenient and simple, yet friction-free connection between Bourdon tube and beam.

Although only one specific embodiment of the invention has been illustrated and described, many changes and modifications will suggest themselves to those skilled in the art. The invention is, therefore, not to be limited to the embodiment selected for this disclosure; the true scope of the invention being defined only in the appended claim.

What is claimed is:

1. A pressure transducer comprising: a base wall; a Bourdon tube; a cantilever beam having one end fixed relative to said base wall, said beam having a free end, said Bourdon tube having a free end and being located over the free end of said beam; and a strain gage circuit having a strain gage winding, said strain gage winding being fixed to one side of said beam, said Bourdon tube having a plate fixed to its free end in a position parallel to said beam, connecting means including a wire having one end fixed to said plate and the opposite end fixed to the free end of said beam, said wire thereby providing friction-free pivots at its opposite ends, said wire being disposed substantially perpendicular to said plate and said beam, said circuit including a strain gage bridge having said strain gage located in one adjacent leg thereof and another located in the other adjacent leg, said strain gages being fixed to opposite sides of said beam, the width of that portion of said beam to which said strain gages are fixed being tapered down toward the free end thereof in a manner to produce a constant strain region therealong, said Bourdon tube being C-shaped in a predetermined vertical plane, a plane through the central longitudinal axis of said beam perpendicular to said sides being parallel to said predetermined plane, and a shank connected to said Bourdon tube, said shank being sealed through said base wall and having a vertical axis adjacent the fixed end of said beam.

References Cited
UNITED STATES PATENTS

| | | | |
|---|---|---|---|
| 2,772,569 | 12/1956 | Ruge | 73—398 |
| 2,901,905 | 9/1959 | Horst | 73—1 |
| 3,140,614 | 7/1964 | Willis | 73—411 XR |

DONALD O. WOODIEL, Primary Examiner